(12) United States Patent
Rygg

(10) Patent No.: US 9,085,868 B2
(45) Date of Patent: Jul. 21, 2015

(54) OIL BOOM

(75) Inventor: Finn Rygg, Sandefjord (NO)

(73) Assignee: Rygg Consulting, Sande i Vestfold (NO)

( * ) Notice: Subject to any disclaimer, the term of this patent is extended or adjusted under 35 U.S.C. 154(b) by 167 days.

(21) Appl. No.: 13/642,671

(22) PCT Filed: Feb. 23, 2011

(86) PCT No.: PCT/NO2011/000066
§ 371 (c)(1),
(2), (4) Date: Nov. 13, 2012

(87) PCT Pub. No.: WO2011/133041
PCT Pub. Date: Oct. 27, 2011

(65) Prior Publication Data
US 2013/0051917 A1    Feb. 28, 2013
US 2013/0279985 A9    Oct. 24, 2013

(30) Foreign Application Priority Data

Apr. 20, 2010   (NO) .................................. 20100566

(51) Int. Cl.
*E02B 15/04*     (2006.01)
*E02B 15/08*     (2006.01)

(52) U.S. Cl.
CPC ......... *E02B 15/0807* (2013.01); *E02B 15/0814* (2013.01)

(58) Field of Classification Search
CPC .................... E02B 15/0807; E02B 15/0814
USPC ................. 405/23, 28, 60, 63, 64, 66, 70, 71; 210/923
See application file for complete search history.

(56) References Cited

U.S. PATENT DOCUMENTS

| | | | |
|---|---|---|---|
| 3,499,291 A | | 3/1970 | Mikkelsen |
| RE27,452 E | * | 8/1972 | Smith .............................. 405/71 |
| 3,852,978 A | * | 12/1974 | Fossberg ........................ 405/67 |
| 4,129,989 A | * | 12/1978 | Niemi et al. .................... 405/70 |
| 4,388,188 A | * | 6/1983 | Morris ........................ 210/242.3 |
| 5,000,616 A | | 3/1991 | Bell et al. |
| 5,141,359 A | * | 8/1992 | Klockner ........................ 405/26 |
| 2008/0267710 A1 | * | 10/2008 | Yodock et al. .................. 405/63 |
| 2013/0108368 A1 | * | 5/2013 | Bishop ............................ 405/63 |

FOREIGN PATENT DOCUMENTS

| | | |
|---|---|---|
| FR | 1128787 A | 1/1957 |
| FR | 2431572 A | 2/1980 |
| SE | 457543 B | 1/1989 |
| WO | 2005058686 A1 | 6/2005 |

OTHER PUBLICATIONS

International Search Report and Written Opinion dated Jul. 14, 2011.

\* cited by examiner

*Primary Examiner* — Benjamin Fiorello
(74) *Attorney, Agent, or Firm* — Alix, Yale & Ristas, LLP

(57) ABSTRACT

Oil boom for preventing dissemination of oil on an aqueous surface, comprising plate elements which by means of hinges at each side edge are arranged to be joined to a continuous wall. The are arranged to exert an angle-increasing between adjacent plate elements while an adjustable angle delimiting device is connected to every second hinge and is so arranged that the angle between the plate elements only can increase to a certain maximum angle. The plate elements are typically made in a lightweight polymer material having ballast at their lower edge.

20 Claims, 4 Drawing Sheets

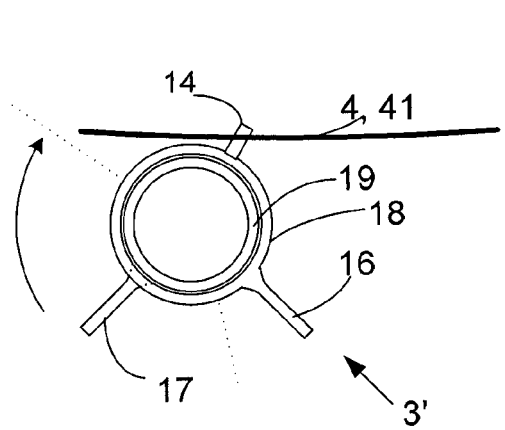
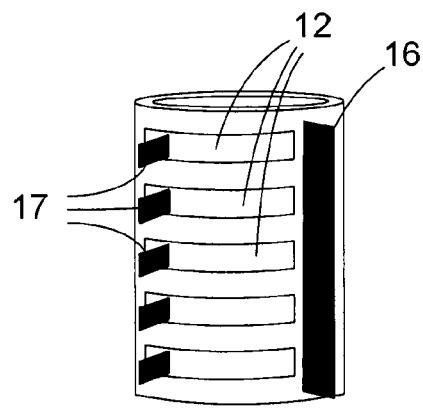
Fig. 4A            Fig. 4B
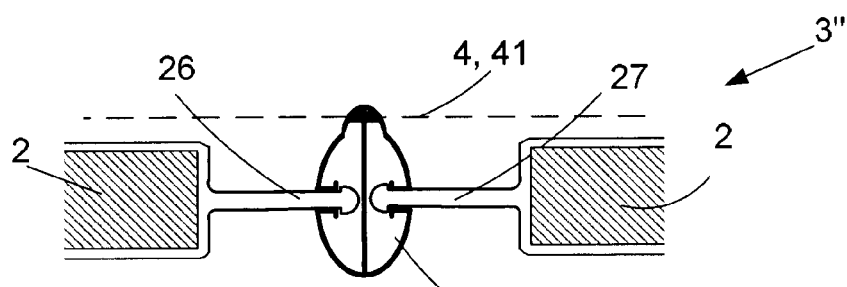
Fig. 5A
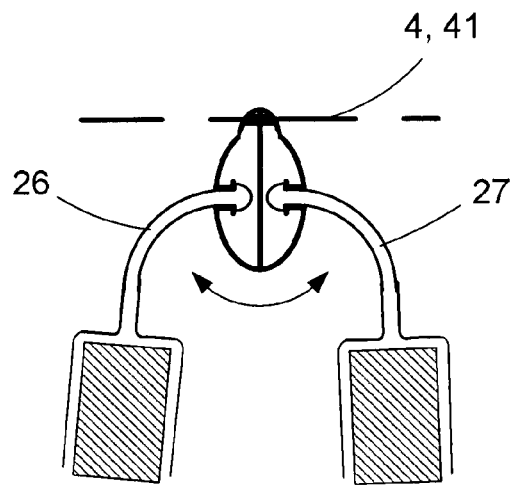
Fig. 5B

OIL BOOM

BACKGROUND

The present invention relates generally to oil booms and more specifically, to oil booms for preventing dissemination of oil on an aqueous surface.

Transportation and handling of oil offshore represent a very large activity globally with corresponding consequences and risks. A significant disadvantage or risk follows from unwanted oil spills offshore, particularly in areas close to land, caused by transportation ships which can run aground during bad weather. There are many examples of such accidents which may cause long term damages to animal life, plant life, fish and least to microorganisms living in the seashore belt.

Many attempts have been made to limit such damages, not the least with regard to recuperation means and oil booms which have the object of holding the oil collected until it can be pumped up or removed in other manners. The oil booms developed until now have, however, proven to exhibit insufficient properties in bad weather and at high wave heights, conditions which are typical when the risk for ships to run aground is high.

Some oil booms are simply too low to be able to hold the oil when the waves are high while others do not lie or stand well in the sea when the wind is hard, thereby allowing the oil to slip over or under the oil booms.

GB 1226 027 describes an oil boom which, when seen from above, has a zigzag pattern that contributes to hold the oil boom stable in the sea under varying conditions. It is suggested to use ropes between adjacent sections of the oil boom to prevent it from opening up too much. There are, however, no means to ensure that the oil boom according to this patent closes (folds together) neither are there means to enable different settings in dependence of the conditions and needs.

There is thus a need for an improved oil boom which is better able to prevent dissemination of oil on a water surface in bad weather and at high wave heights.

SUMMARY

Said objectives are achieved with the oil boom according to the present disclosure. Additional embodiments of the invention are disclosed in the dependent claims.

According to the present disclosure the oil boom, which is assembled from individual plates, that are hinged together, is stabilized through the fact that the mutual angle between adjacent plates is adjusted and "locked" in desired position by means of the so-called angle delimiting device.

It is basically desirable to use an angle as large as possible between the plate elements since the oil boom in this condition covers the largest possible extension. When the wind is hard it will, however, be better to use a smaller angle since an angle reduction from close to 180 degrees to an angle less than 90 degrees, will stabilize the oil boom significantly, so that it is not pulled over by the wind. In practice it will therefor be required to use a higher number of oil booms to cover a certain distance in strong wind as compared to in a light breeze.

The plate elements are made of a light weight material provided with ballast at their lower edge. The light weight material can be an expanded polymer, such as rigid, expanded PVC, polyethylene or polyurethane. The light weight material may also comprise light metal and the ballast can be any material with high specific density, which is not harmful to the environment and which is durable when placed in the sea and in contact with oil.

The ballast which is attached to the lower part of the plate elements naturally contributes to the stability of the oil boom. Use of ballast is well known in the art, but not in combination with self-expandable oil booms with an angle delimiting device ensuring that one and the same oil boom can be adapted to different kinds of weather and function well in strong winds as well as in light breeze. It is, however, important that the mass of the ballast be adapted to the volume and mass of the plate element so that each plate element and thereby the entire oil boom, will stand appropriately deep into the sea.

The ballast may be discrete elements or have the shape of a heavy, continuous "cable" that lies along the lower part of the plate elements. The ballast can be attached directly to the plate elements or to the lower part of a skirt which in turn is tightly attached to the lower edge of the plate elements. The purpose of the skirt will be to reach lower depths and thereby to a higher degree of certainty prevent the oil from passing below the oil boom in wave troughs, without having to increase the weight of the ballast as much as otherwise required. This is due to the skirt, typically being a soft sheath of plastic or rubber, displaces much less water per depth and per length distance than the plate elements do. The skirt also requires less space during storage and transportation, but cannot generally replace the plate elements, since the rigidity that only the plate elements provide is required over the sea level.

Use of the skirt is not mandatory but can contribute to reduce the probability of leakages when the weather is particularly bad. During hard wind and high wave heights, which typically occur at the same time, there is an increased risk of oil spilling over the oil boom as well as under the oil boom. It could be tempting to place the oil boom less deep into the sea, by using less ballast, to thereby prevent oil from slipping over the oil boom, but the risk that oil could slip under the oil boom would then increase, while at the same time the stability of the oil boom would suffer. The solution could therefore be to allow the plate elements to stand relatively high in the sea and to adjust the stability by adjusting the angle between the plate elements. Extra safety against oil leakage under the oil can optionally be achieved by use of skirt while the oil boom is generally maintained in its high position in the sea. If or when the oil boom according to the invention is provided with skirt, the skirt can, until the oil boom is placed in the sea, be folded up along the plate elements and be temporarily attached to the plates with clips to not interfere during storage and positioning in the sea.

BRIEF DESCRIPTION OF THE DRAWINGS

Below the invention is further described in the form of chosen exemplary embodiments shown in drawings, in which:

FIGS. 4A and 4B show a different variant of a hinge between to plate elements of an oil boom according to the present invention;

FIGS. 5A and 5B show still another variant of a hinge between to plate elements of an oil boom according to the present invention;

DETAILED DESCRIPTION

Figure 1:
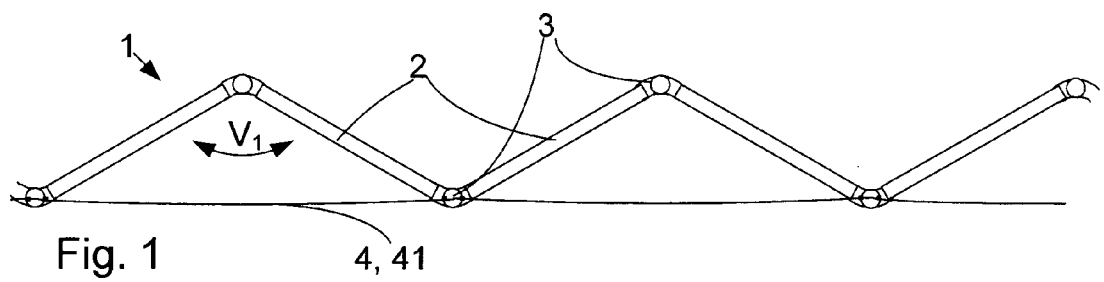
FIG. 1 is a top view of a section of an oil boom according to the present invention in a certain position.

FIG. 1 shows a part of an oil boom 1 according to the present invention, seen from above and in a position typical for a calm sea. The angle between each adjacent plate element 2 of the oil boom 1 is larger than 90 degrees, typically in the range 135 to 150 degrees. In this position the oil boom 1 covers a linear distance of 92-94% of its theoretical maximum (at an angle of 180 degrees). The hinges 3 contribute to bend open the angle $v_2$ as much as an angle delimiting device allows. The latter is adjusted according to the weather situation and the conditions in general when the oil boom 1 is put out.

Figure 2:
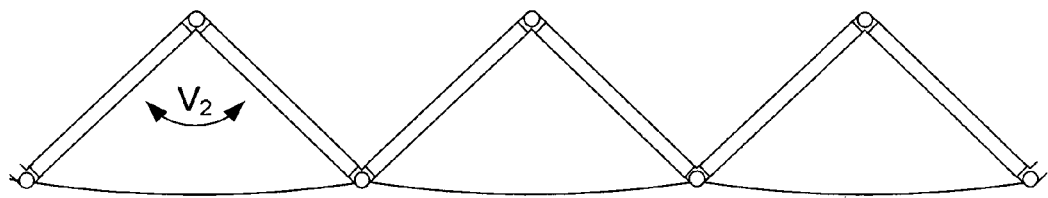
FIG. 2 is view of the oil boom in FIG. 1 in another position.

FIG. 2 shows the oil boom 1 of FIG. 1 in a position which is typical for tougher weather, like strong breeze and high waves. The angle $v_2$ between each of the adjacent plates of the oil boom 1 is in the magnitude 75-90 degrees. In this position the oil boom 1 is far more stable and is not pulled over even by the strong wind. This, however, affects the ability of the oil boom 1 to extend (horizontally) which in this case is in the range 60-70% of the theoretical maximum for the oil boom 1 in question. This can be also expressed in this way: In strong wind and in high waves the number of oil booms 1 required to cover a certain linear extension, will be about 50% more than during calm conditions.

In a certain situation there will often be a need to connect a number of oil booms 1 to form a longer, continuous wall of oil booms 1, alternatively to assemble a more or less closed circle of oil booms 1 around a spill area. It is therefore of importance that the outermost hinge 3 at each end of the oil boom 1 is so arranged that it may easily be connected to a corresponding hinge 3 at the end of another oil boom 1. The joining can take place already when the oil booms 1 are released from a vessel or after having been placed in the sea. The latter may be a demanding task, especially in rough sea, and it is therefore preferred that the oil booms 1 are joined before being put out from the vessel, such as immediately before being put out.

Figure 3:
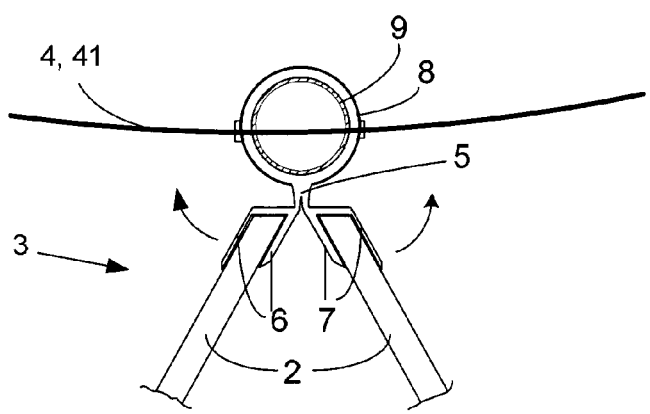
FIG. 3 shows a detail of a variant of a hinge between two plate elements of the oil boom according to the present invention.

FIG. 3 shows an embodiment of a hinge 3 for joining of the different plate elements 2 which are part of an oil boom 1 according to the present invention. The hinge 3 according to this embodiment is mainly comprised by a flexible material which has two extending flanges 6, 7, each pair of which being arranged to envelop and hold a side edge of a plate element 2 of the oil boom 1.

In one embodiment, through bolts or the like (not shown) may be included to ensure that the hinges 3 are securely attached to the plate elements 2 and the flanges 6 and 7 and plate elements 2 are securely attached to one another. As illustrated in FIG. 3 by arrows, the flanges 6, 7 will be pre-tensioned so that the hinge 3 tends to open up, i.e. that the angle between two adjacent plates joined at the hinge, will tend to increase until a force in the opposite direction stops the angle increasing movement. The force that tends to increase the angle between the flanges 6, 7 and thereby between the plate elements 2 can be due to the elasticity of the material combined with the method with which the hinge is produced. The force can, however, also be introduced in the hinge by use of mechanical means, such as one or more strategically arranged steel springs which can be partly or wholly embedded to be protected from external influences. This functionality is not explicitly shown in FIG. 3.

The hinge shown in FIG. 3 is bridged via an intermediate area 5 to a ring-shaped part 8 which internally is reinforced with a sleeve 9 in a rigid material, such as metal, typically aluminium. The hinge should extend in near the entire height of the plate elements to form an oil-tight "seal" between the latter, or could be designed as a number of vertically discontinuous hinges having some sealing material between the separate hinges.

The hinges 3 preferably allow an angle movement between two adjacent plate elements 2 from 0 to 90 degrees, more preferred from 0 degrees to 135 degrees and most preferred from 0 degrees to 180 degrees. The flexible material is typically chosen among oil resistant nitrile rubber, a mixture of PVC and nitrile and neoprene.

The hinge 3" has a function rather similar to hinge 3 (of FIG. 3) but illustrates more clearly that the hinge is designed to provide an angle-increasing force between two adjacent plates until the angle is close to 180 degrees. It should be noted that one of ordinary skill in the art will understand that the angle-increasing force inherent with such a design is large when the angle is small and is reduced with increasing angle. This is a property which can be utilized in some embodiments of the invention, as commented below.

FIG. 4 shows another embodiment of a hinge 3' not making use of flexible materials but a hinge comprising an outer and an inner sleeve 18 and 19, respectively, and where extending flanges 16, 17 form outer and inner sleeves respectively and are attached to separate plate elements 2 of the oil boom 1. The flange or flanges 16 from the outer sleeve 18 can be continuous, while the flanges 17 from inner sleeve 19 are discontinuous and protrude from "windows" 12 in the outer sleeve 18 as shown in FIG. 4B. In FIG. 4 the flanges are not shown in pairs, there is only shown one flange 16 from outer sleeve 18 and individual flanges 17 in each window 12 of the inner sleeve 19. With a hinge 3' of rigid material as shown in FIGS. 4A and 4B there is no need for flanges on both sides of the plate elements' side edges. It is sufficient with a flange on a chosen side of each plate element 2, provided that the plate elements integrity is such that—by itself or after being applied with a reinforcing layer in the area of the plate element 2 which comes in contact the flange 16 or 17—a lasting attachment between plate element and hinge is obtainable. (Dependent upon the choice of material and dimension, also flexible hinges 3 as shown in FIG. 3 can comprise single flanges rather than flanges in pairs). The attachment of the plate element to a hinge as such can be made in any suitable way, such as using bolts, cassette locks, adhesives and the like.

With regard to the hinge shown in FIGS. 4A and 4B, even this is arranged to exert an opening or angle-increasing force between the flanges 16 from outer and inner sleeve 17 so that the oil boom automatically will fold out to desired maximum angle determined by the angle delimiting device.

The angle delimiting device 4 is schematically shown as a soft connecting line between every second hinge in the FIGS. 1 and 2, correspondingly through the ring of the hinge in FIG. 3 and through a particular bracket 14 on the hinge shown in FIG. 4A. When the oil boom is put out, "stoppers" according to one embodiment are placed at desired intervals along the angle delimiting device 4, the stoppers—which also are part of the angle delimiting device—have such a shape and dimension that they cannot pass through the bracket 14.

FIG. 5A shows still another alternative hinge 3" between two adjacent plate elements 2, the hinge 3" comprises flexible coupling parts 26 and 27, which are attached to a splicing socket 28 which typically is made of more rigid material. As evident from FIG. 5A the hinge 3" tends to straighten the plate elements along a straight line, or an angle at 180 degrees, if the hinge 3" is not exposed to external forces.

In FIG. 5B the same hinge is shown with an acute angle between adjacent plates. In this position the hinge 3" will, as indicated by arrows, exert an angle-increasing force, and if the angle shall remain in this position an external force must be applied, typically in the form of a particular angle delimiting device 4. The angle-increasing force will, due to the flexibility of the coupling parts 26, 27, increase with reducing angle from 180 degrees down to 0 degrees. A person skilled in the art will understand that other embodiments of hinges that can be pre-tensioned with an angle-increasing force are possible and within the scope of the present invention.

Figure 6A:
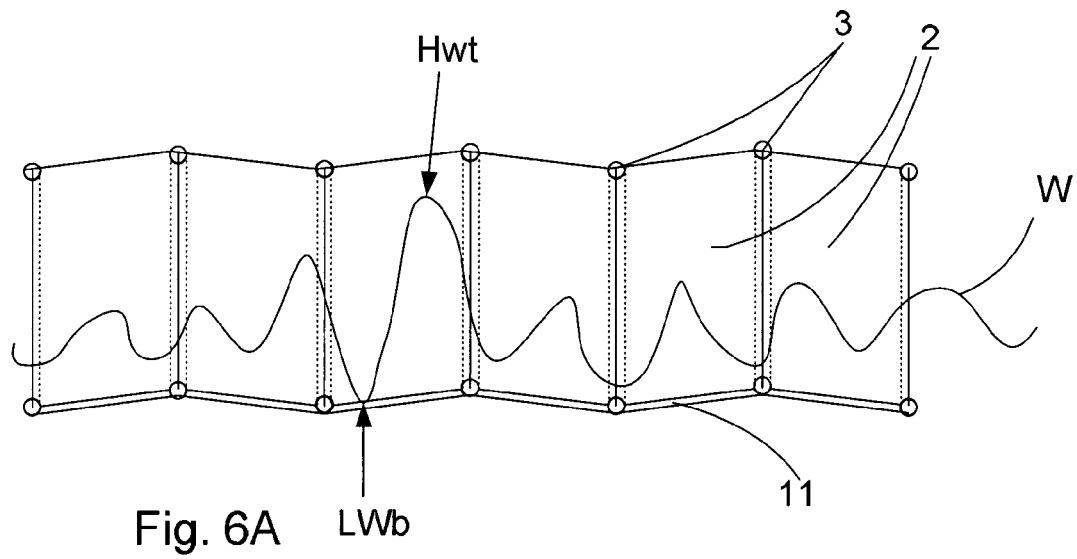
FIGS. 6A and 6B are side views of two variants of the oil boom according to the present invention in the sea.

FIG. 6A provides a side view of an oil boom according to the present invention in the sea. At the lower edge of the plate element a string of ballast 11 is shown, having high density and contributing to the stabilizing of the oil boom at desired depth in the sea. It is easiest to use ballast in the form of a continuous string but discrete ballast elements placed at intervals along the lower edge of the plate elements are also feasible.

Figure 6B:
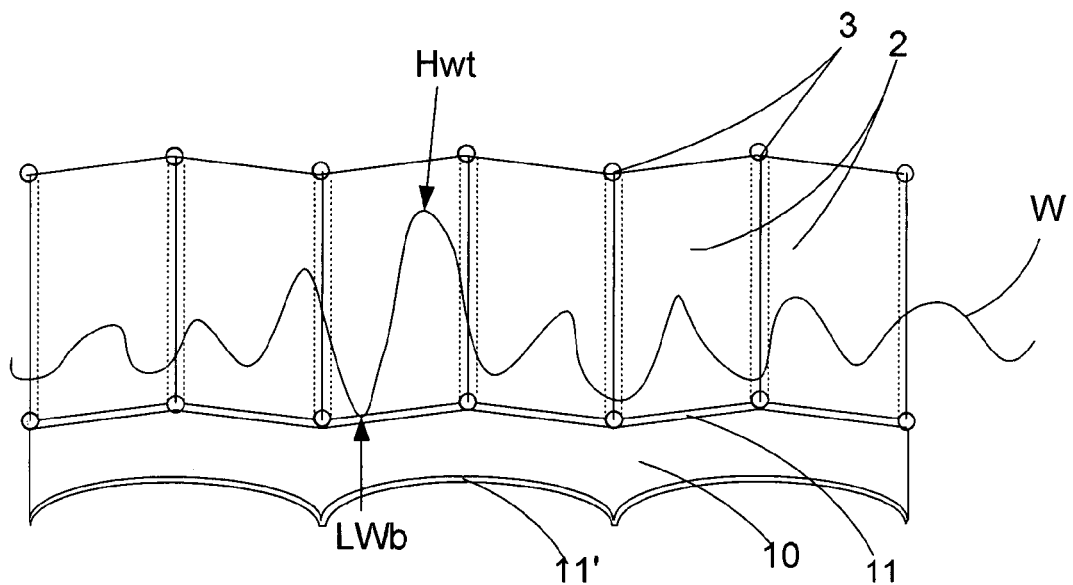

In FIG. 6 waves W with varying wave tops and wave troughs are shown in a situation of considerable wind and waves. The highest wave top Hwt in FIG. 5A is lower than the top of the plate elements 2 so there is no risk of leakage over the oil boom. The lowermost wave trough Lwb is, however, dangerously close to the lower edge of the plate elements 2. When there is such a difference between the highest wave top and the lowest wave trough as shown in FIG. 5, it will be convenient to use a skirt in tight attachment to the plate elements.

In FIG. 5B an oil boom corresponding to that of FIG. 5A is shown, except that to the lower edge of the plate elements 2 a skirt 10 is attached, while an extra string of ballast 11' is attached to the lower edge of the skirt 10. This embodiment tolerates higher wave heights—the difference between wave top and wave trough—before a risk of leakage of oil under or over the oil boom occurs.

Figure 7A:
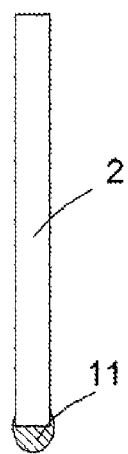
FIGS. 7A and 7B are end sectional views of the plate elements of the oil boom in two variants.
Figure 7B:
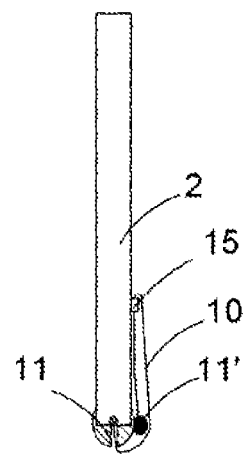

FIG. 7A provides a side view of a single plate element 2 having a ballast 11 along its lower edge. FIG. 7B shows a corresponding side view where the plate element is provided with a skirt 10. In the condition shown the skirt is double folded along the side of the plate element as it typically will be before being put out, and attached to the plate element with clips 15. In this manner the skirt does not constitute much of an obstacle when the oil boom 1 is folded to be stored or put in a state of readiness. When being put out in the sea, the skirt can easily be pulled free from the clips whereafter the ballast 11' ensures that the skirt takes a substantially vertical position in the sea.

Figure 8:
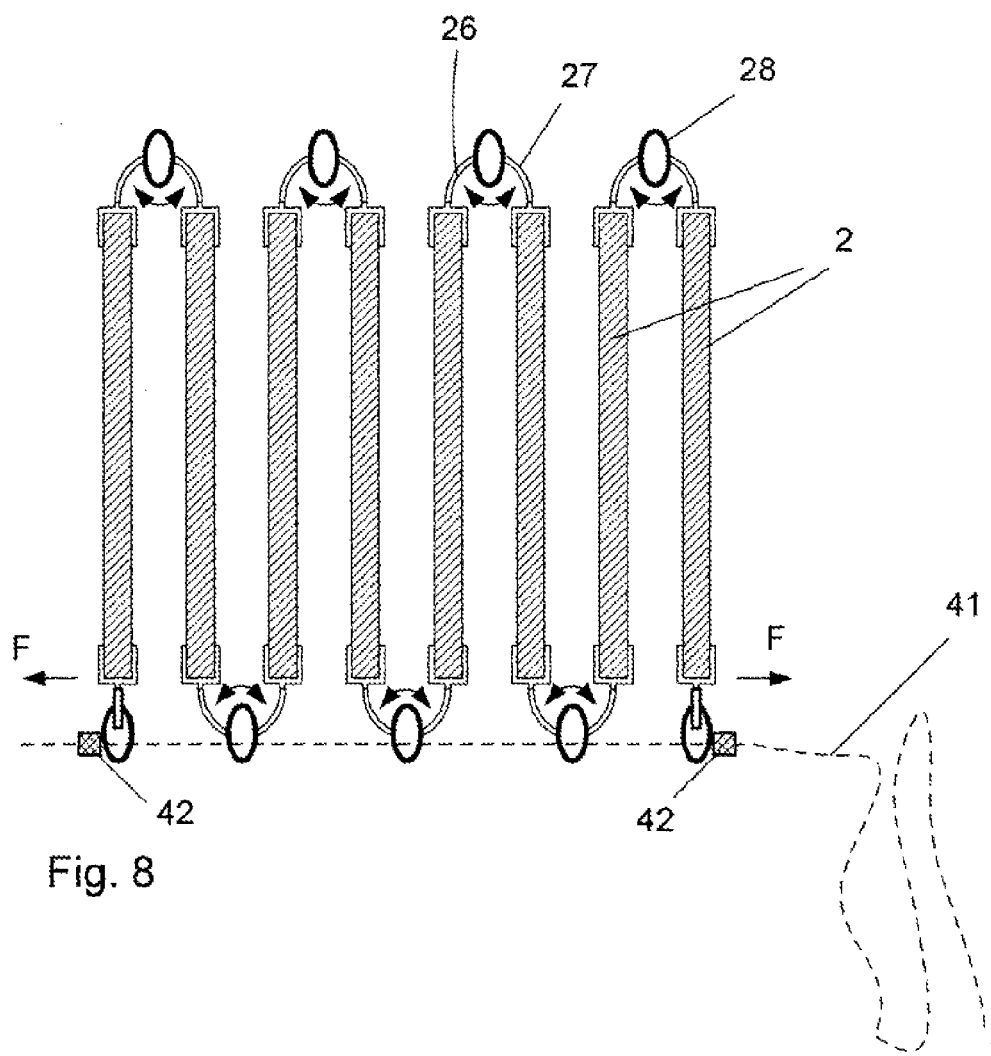
FIG. 8 is a top view of an oil boom according to the present invention, in a folded condition.

FIG. 8 shows schematically a top view of an embodiment of the oil boom according to the present invention while still being almost completely folded together and being held by an angle delimiting device 4 comprising a line 41 having two stoppers 42. Stoppers are configured at the outermost hinges. It should else be noted that the hinges shown in FIG. 8 are the kind shown in more detail in FIG. 5, but also the hinges according to FIGS. 3 and 4 can be used in combination with the embodiment of the angle delimiting device 4 shown in FIG. 8.

By using identical hinges where the angle-increasing force is reduced with increasing angle and vice versa, the angle between all adjacent plates will be approximately the same, based on a simple balancing of the force in the system. If an angle at a certain moment in time is comparatively small while another one is larger, the angle increasing force from the hinge where the angle is small, will be larger than that of the hinge with the larger angle, an unbalance that will be settled by an increase of the small (acute) angle and a reduction of the larger angle until the two are similar. This will take place independent of whether the two angles are close to one another or at a far distance from one another since the forces continuously are distributed along the entire oil boom. In this manner the angle adjustment takes place dynamically, meaning that it will largely adapt to waves and wind and does not require stoppers at each hinge.

When putting out an oil boom with an angle delimiting device 4 as shown in FIG. 8, the stopper 42 which is shown to the right in the Figure, is moved to a desired position along the line 41, farther out the calmer the weather and the lower the waves, to allow the largest secure extension of the oil boom under the actual conditions. The angle-increasing force that is effective at each hinge 3 is illustrated with curved arrows, and the sum of these forces results in an oil boom expanding force F visualized with arrows low to the left and right in FIG. 8. The oil boom will, as a consequence thereof always expand until stopped by the angle delimiting device 4.

The oil boom according to the present invention can typically be equipped with light and/or reflective material along an upper edge to improve its visibility in the sea.

Prior to putting out the oil boom according to the present invention, it will typically be folded tightly together like a compressed accordion. In the case of an oil boom with a skirt 10, the skirt will be double folded along the plate elements so that lower edge of the skirt and the ballast attached thereto will be level with the lower edge of the plate elements 2, while the center line of the skirt in horizontal direction can be attached to the plate elements with clips so that the skirt remains in place until being pulled free.

When the oil boom is put out, it is determined in dependence of weather, wind and other conditions to how large angle the angle delimiting device 4 shall allow the oil boom to open and the angle delimiting device 4 is adjusted accordingly, for instance by using pairs of stoppers (not shown) at certain intervals along an angle delimiting device 4 which has the general form of a line. The larger the distance between each of the two stoppers in each pair, the larger the angle for the oil boom is allowed to open. The advantage with a large angle is that the oil boom covers a relatively large distance, while the advantage with a small angle is a higher degree of stability. The chosen angle is therefore a compromise between these two considerations.

It is convenient to make oil booms in standard lengths and for a certain use requirement a number of oil booms are interconnected to form a longer wall or a closed circle of oil booms. The launching typically takes place from a boat (not shown) and the interconnection of an oil boom with the next one typically is performed in the boat when launching. Alternatively the interconnection can also be made in the sea. When closing a number of oil booms to a closed circle, the closure needs to be done in the sea. The outermost hinge of each free end of an oil boom, exhibits an unused hinge half that instead of being used for holding a plate element can be used for connection to another corresponding oil boom with a correspondingly unused hinge half.

It is natural that all hinges of an oil boom according to the present invention are the same type, but a person of ordinary skill in the art will understand that the effect of the present invention may also be reached if the hinges alternate between a kind that actively opens the oil boom and hinges that are passive or neutral.

An oil boom according to the present invention is also environmentally favorable in the sense that 90% of the oil boom can be recycled to a plastic feed material, which can alternatively be used for the production of energy.

The invention claimed is:

1. An oil boom for preventing dissemination of oil on an aqueous surface, comprising plate elements which by means of hinges disposed at a pair of opposed side edges are arranged to be joined to a continuous wall, wherein the hinges are arranged to exert an angle-increasing force between the plate elements while an adjustable angle delimiting device comprising a line provided with stoppers arranged to be positioned in any desired position along the line, is connected to every second hinge, and is so arranged that an angle between the plate elements only can increase to a certain maximum angle.

2. The oil boom as claimed in claim 1, wherein the angle delimiting device includes a pair of movable stoppers, one stopper beyond each of the hinges disposed at opposed ends of the oil boom.

3. The oil boom as claimed in claim 1, wherein the plate elements are made of a light weight material provided with a ballast disposed at a lower edge of the plate elements.

4. The oil boom as claimed in claim 3, wherein the light weight material is selected from the group consisting of a material of expanded polymer material and expanded light metal.

5. The oil boom as claimed in claim 1, wherein the plate elements substantially comprise rigid, expanded polymer material selected from the group consisting of PVC, polyethylene, and polyurethane.

6. The oil boom as claimed in claim 1, wherein at least one of the hinges comprises a flexible material provided with two pairs of flanges adapted to hold each respective side edge of two adjacent plate elements.

7. The oil boom as claimed in claim 6, wherein the flexibility of the hinge allows an angle change between two adjacent plate elements from approximately 0 degrees to approximately 90 degrees.

8. The oil boom as claimed in claim 6, wherein the flexibility of the hinge allows an angle change between two adjacent plate elements from approximately 0 degrees to approximately 135 degrees.

9. The oil boom as claimed in claim 6, wherein the flexibility of the hinge allows an angle change between two adjacent plate elements from approximately 0 degrees to approximately 180 degrees.

10. The oil boom as claimed in claim 6, wherein the two pairs of flanges meet in an intermediate area and end in a ring shaped area which is internally reinforced by a sleeve of a rigid material, arranged for interaction with the angle delimiting device.

11. The oil boom as claimed in claim 6, wherein the flexible material selected from the group consisting of oil resistant nitrile rubber and a mixture of PVC, nitrile and neoprene.

12. The oil boom as claimed in claim 1, wherein at least one hinge comprises first and second mainly sleeve shaped bodies having different diameters, said second sleeve shaped body received in said first sleeve shaped body, both provided with extending flanges adapted to be attached to a side edge of separate adjacent plate elements.

13. The oil boom as claimed in claim 12, wherein the hinges also are provided with a bracket arranged to interact with the angle delimiting device.

14. The oil boom as claimed in claim 1, wherein the hinges comprise two flexible coupling parts which meet in a splicing socket so arranged that the coupling parts will be aligned with one another when not exposed to external forces.

15. An oil boom for preventing dissemination of oil on an aqueous surface, comprising plate elements which by means of hinges disposed at a pair of opposed side edges are arranged to be joined to a continuous wall, wherein the hinges are arranged to exert an angle-increasing force between the plate elements while an adjustable angle delimiting device is connected to every second hinge and is so arranged that an angle between the plate elements only can increase to a certain maximum angle, and wherein at least one hinge comprises first and second mainly sleeve shaped bodies having different diameters, said second sleeve shaped body received in said first sleeve shaped body, both provided with extending flanges adapted to be attached to a side edge of separate adjacent plate elements.

16. The oil boom as claimed in claim 15, wherein the hinges also are provided with a bracket arranged to interact with the angle delimiting device.

17. The oil boom as claimed in claim 15, wherein at least one of the hinges comprises a flexible material provided with two pairs of flanges adapted to hold each respective side edge of two adjacent plate elements.

18. An oil boom for preventing dissemination of oil on an aqueous surface, comprising plate elements which by means of hinges disposed at a pair of opposed side edges are arranged to be joined to a continuous wall, wherein the hinges are arranged to exert an angle-increasing force between the plate elements while an adjustable angle delimiting device is connected to every second hinge and is so arranged that an angle between the plate elements only can increase to a certain maximum angle, and wherein the hinges comprise two flexible coupling parts which meet in a splicing socket so arranged that the coupling parts will be aligned with one another when not exposed to external forces.

19. The oil boom as claimed in claim 18, wherein at least one of the hinges comprises a flexible material provided with two pairs of flanges adapted to hold each respective side edge of two adjacent plate elements.

20. The oil boom as claimed in claim 18, wherein at least one hinge comprises first and second mainly sleeve shaped bodies having different diameters, said second sleeve shaped body received in said first sleeve shaped body, both provided with extending flanges adapted to be attached to a side edge of separate adjacent plate elements.

* * * * *